United States Patent
Du et al.

(10) Patent No.: US 10,519,352 B2
(45) Date of Patent: Dec. 31, 2019

(54) ADHESIVE COMPOSITION WITH HIGH FREQUENCY CHARACTERISTICS AND APPLICATION THEREOF

(71) Applicant: MICROCOSM TECHNOLOGY (SUZHOU) CO., LTD., Suzhou, Jiangsu (CN)

(72) Inventors: Donghai Du, Jiangsu (CN); Sih-Ci Jheng, Tainan (TW); Chao-Chin Chuang, Tainan (TW)

(73) Assignee: MICROCOSM TECHNOLOGY (SUZHOU) CO., LTD., Suzhou (CN)

( * ) Notice: Subject to any disclaimer, the term of this patent is extended or adjusted under 35 U.S.C. 154(b) by 72 days.

(21) Appl. No.: 15/257,942

(22) Filed: Sep. 7, 2016

(65) Prior Publication Data

US 2018/0022976 A1    Jan. 25, 2018

(30) Foreign Application Priority Data

Jul. 20, 2016    (CN) .......................... 2016 1 0571466

(51) Int. Cl.
| | | |
|---|---|---|
| *C09J 179/08* | (2006.01) | |
| *C09J 11/04* | (2006.01) | |
| *C09J 7/00* | (2018.01) | |
| *C09J 11/06* | (2006.01) | |
| *C09J 11/08* | (2006.01) | |
| *C08L 71/12* | (2006.01) | |
| *C08L 63/00* | (2006.01) | |
| *C08L 15/00* | (2006.01) | |
| *C08L 53/02* | (2006.01) | |
| *C08K 3/36* | (2006.01) | |
| *C08K 3/22* | (2006.01) | |
| *C08K 5/3445* | (2006.01) | |

(52) U.S. Cl.
CPC ............. *C09J 179/08* (2013.01); *C09J 11/04* (2013.01)

(58) Field of Classification Search
None
See application file for complete search history.

(56) References Cited

U.S. PATENT DOCUMENTS

| | | | | |
|---|---|---|---|---|
| 5,087,681 | A * | 2/1992 | Kinloch ................. | C08C 19/36 525/282 |
| 2005/0143534 | A1* | 6/2005 | Dueber .................. | B32B 27/08 525/476 |
| 2018/0206345 | A1* | 7/2018 | Yoneda .................. | B32B 15/08 |

FOREIGN PATENT DOCUMENTS

| | | | |
|---|---|---|---|
| JP | 2010229274 A | * | 10/2010 |
| JP | 2014034580 A | * | 2/2014 |
| JP | 2016041797 A | * | 3/2016 |

* cited by examiner

*Primary Examiner* — Randy P Gulakowski
*Assistant Examiner* — Ha S Nguyen

(57) ABSTRACT

An adhesive composition with high frequency characteristics and the application thereof; wherein, the adhesive composition has a total weight of (A), (B) and (C) in 100 parts by weight, comprising: (A) 40-80 parts by weight of solvent-soluble polyimide; (B) 5-30 parts by weight of propenyl-modified polyphenylene oxide resin; (C) 10-30 parts by weight of epoxy resin; and optionally comprising at least one of the following components: (D) flexibilizer; (E) flame retardant; (F) inorganic filler; (G) coupling agent; and (H) catalyst. The adhesive composition has the advantages of low dielectric constant, low dielectric loss, favorable heat resistance and low-temperature (<180° C.) adhesion. The adhesive composition can be used for preparing high-frequency protective membrane and high-frequency adhesive film.

3 Claims, 1 Drawing Sheet

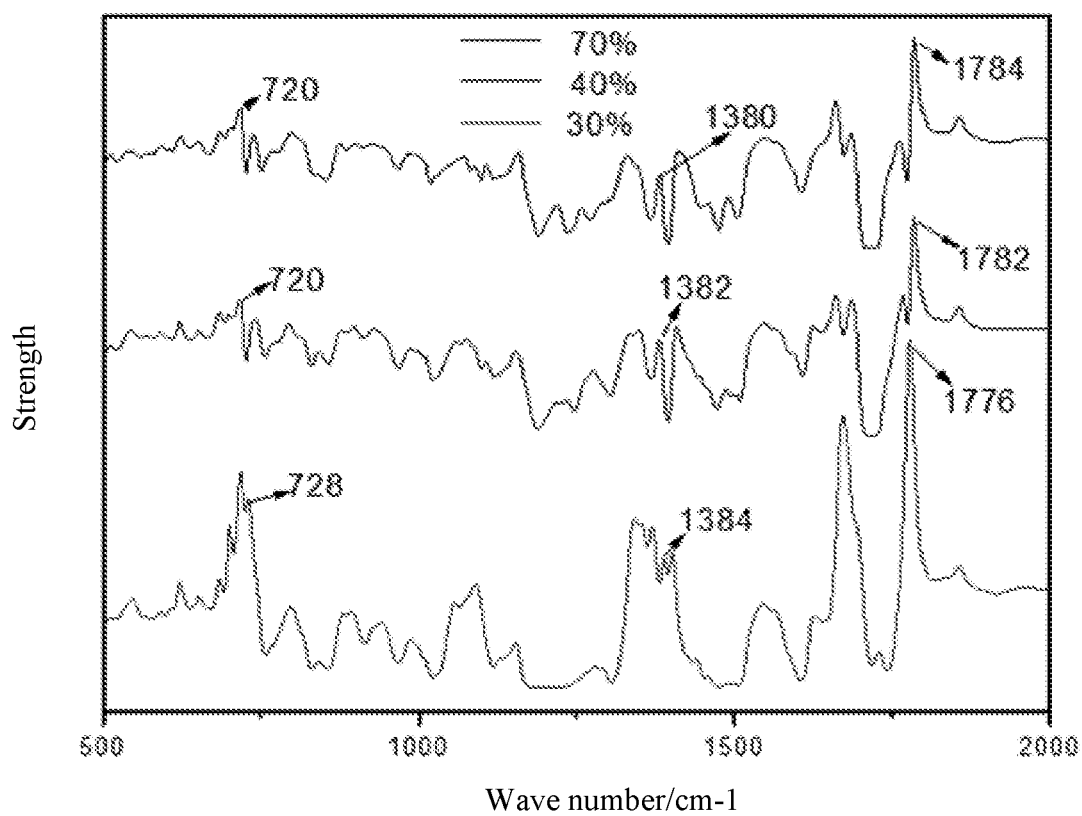

ADHESIVE COMPOSITION WITH HIGH FREQUENCY CHARACTERISTICS AND APPLICATION THEREOF

CROSS-REFERENCE TO PRIOR APPLICATION

This application claims the benefit of Chinese Patent Application No. 201610571466.6 filed on Jul. 20, 2016, the contents of which are incorporated herein by reference.

TECHNICAL FIELD

The Invention relates to the technical field of thigh-frequency adhesive composition, particularly to an adhesive composition with low dielectric constant (Dk), low dielectric loss (Df), favorable heat resistance and low-temperature adhesion, and the manufacturing method and application thereof.

BACKGROUND ART

With the overall requirements of terminal application products for stronger integrated functions, higher resolution, faster response speed and larger storage capacity, the development tendency of the flexible printed circuits (FPCs) is becoming more obvious in high frequency, high speed and functionalization. For example, mobile phones have integrated more and more functions, including camera, Bluetooth, Wi-Fi, 3G internet access, etc. besides the conventional voice and video functions; in the future, fingerprint identification and all kinds of sensor components will be integrated too, making the broadband further increased and facilitating constant development of high-frequency and high-speed application technologies. High Dk decreases the signal transmission rate and high Df makes signals partially transformed into heat energy and lost in baseplate materials; therefore, decreasing the Dk/Df has become a hotspot in the baseplate industry and all kinds of new technologies and baseplate products with regard to Dk/Df have emerged in large numbers.

Currently, the material most commonly used in FPCs to solve the problem of high-frequency signal transmission is liquid crystalline polymer (LCP), for its characteristics of low dielectric constant and low dielectric loss required in high-frequency transmission. Take iPhone, the leading brand of smart phone for example, after it is disassembled, two FPCs are found using LCP as the cable for high speed transmission of signals. The imported mobile communication of high-frequency transmission is gradually emerging in the field of smartphone.

Although LCP FPC has inborn advantages in high frequency characteristics, the high-temperature equipment and conditions for processing are obviously different from the current mainstream process technology of low-temperature quick press for FPC. Therefore, apart from the processing equipment replaced by a pressure-transmitting device for pressing LCP base material in high temperature, the production rate is also affected. To address the application problem, high-frequency adhesives for low-temperature (<180° C.) adhesion are becoming an important option in the development of FPC materials.

SUMMARY OF THE INVENTION

Directing at the shortcomings in prior art, the Invention is to provide an adhesive composition with high frequency characteristics that can used for preparing high-frequency protective membrane and high-frequency adhesive film. The other purpose of the Invention is to provide the application of the above mentioned adhesive composition with high frequency characteristics.

The Invention uses the following technical schemes to achieve the above purposes:

An adhesive composition with high frequency characteristics has a total weight of A, B and C in 100 parts by weight, comprising:

A: 40-70 parts by weight of solvent-soluble polyimide;
B: 5-25 parts by weight of propenyl-modified polyphenylene oxide resin;
C: 10-30 parts by weight of epoxy resin;

The adhesive composition also optionally comprises at least one of the following components:

D: flexibilizer;
E: flame retardant;
F: inorganic filler;
G: coupling agent; and
H: catalyst.

The adhesive composition described in the Invention, wherein, the polyimide monomer is selected from dissoluble polyimide resin; each molecule of the polyimide resin contains at least two of fluorine functional group, aliphatic functional group and alicyclic functional group; the structure is expressed by the following formula:

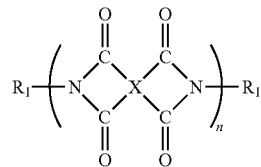

Wherein, R1 separately and independently represents an organic group containing carboxyl; X separately and independently represents a quadrivalent organic group containing at least two of fluorine functional group, aliphatic functional group and alicyclic functional group; n is an integer above 0.

The adhesive composition described in the Invention, wherein, the end group of the thermosetting modified polyphenylene oxide (PPO) resin contains the organic group of hydroxyl, propenyl, vinyl, styryl or epoxy group; the structure is expressed by the following formula:

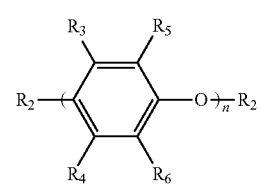

Wherein, R2 is selected from the organic group containing hydroxyl, propenyl, vinyl, styryl or epoxy group; R3 and R4, identical or different, are alkyl or phenyl with a carbon number below 6; R5 and R6, identical or different, are alkyl or phenyl with a carbon number below 6; n is an integer larger than zero but smaller than 300.

Preferably, the molecular weight of polyphenyl ether is 1000-5000; because when molecular weight is less than 1000, the heat resistance of the material will be decreased and when it is more than 5000, the melt viscosity of the material is extremely high, decreasing the cohesiveness of the material.

The adhesive composition described in the Invention, wherein, the epoxy resin is selected from one or plurality of combinations of fluoride epoxy resin, dicyclopentadiene epoxy resin, biphenyl epoxy resin, naphthaline-containing epoxy resin and novolac epoxy, preferably novolac epoxy and biphenyl epoxy resin; in the Invention, the epoxy resin serves as a hardening agent to realize the effect of cross-linking and solidification with polyimide.

The adhesive composition described in the Invention, wherein, the flexibilizer is to provide the adhesive with high flexibility after high-temperature curing, i.e., to increase flexibility of the adhesive; the flexibilizer is selected from one or plurality of combinations of styrene-butadiene rubber, styrene-butadiene-styrene (SBS) block copolymer, butyl rubber, acrylic rubber, butadiene rubber and fluoro-rubber;

The adhesive composition described in the Invention, wherein, the catalyst is selected from imidazole catalysts, such as one or plurality of combinations of the imidazole compounds as 2-methylimidazole, 1-phenyl-2-methylimidazole, 2-ethyl-4-methylimidazole, 2-undecylimidazole, 2-phenylimidazole, 1-cyanoethyl-2-ethyl-4-methylimidazole.

The adhesive composition described in the Invention, wherein, the inorganic filler is to improve the dimensional stability, heat resistance and mechanical perforating possibility of the adhesive after high-temperature curing. The filler is selected from one or plurality of aluminium oxide, aluminium hydroxide, magnesium hydroxide, silicon dioxide, talcum powder, zeolite, titanium dioxide, wollastonite aluminium nitride, calcium silicate, mica, calcium carbonate and clay; the grain diameter of the inorganic filler is 0.01-20 µm; wherein, aluminium hydroxide and silicon dioxide are preferred.

The adhesive composition described in the Invention, wherein, by adding coupling agent, the viscosity of the adhesive can be adjusted, the excessive glue can be controlled effectively and the bonding strength of the adhesive can be improved. The coupling agent comprises silane coupling agent and titanate coupling agent, wherein, the silane coupling agent comprises KH171, KH151, KH172, KH792, KH550, KH560, KH570, KH530 and KBM603; the titanate coupling agent comprises TMC-101, TMC-102, TMC-201, TMC-105, TMC-311w, TMC-311, TMC-TTS and TMC-2; wherein, silane coupling agent and KH792 are preferred.

The solvent for the adhesive is selected from one or plurality of butanone, acetone, methylbenzene, xylene, methyl acetate and cyclohexanone; the solvent dosage is unrestricted but a 30-60% solid content is preferred.

The method for preparing the adhesive composition includes the following steps to: 1) Dissolve soluble polyimide, polyphenyl ether and epoxy resin in corresponding solvents respectively;

2) Mix the rubber, inorganic filler and flame retardant, add the solvent and stir well to prepare a sizing agent;

3) Mix the mixtures 1) and 2), add coupling agent and accelerant and stir well to obtain the adhesive composition.

The adhesive composition with high frequency characteristics is applied to preparing high-frequency protective membrane and high-frequency adhesive film.

In addition, the Invention provides an adhesive film and a covering membrane, the product obtained by applying the adhesive composition of the Invention onto the surface of the flexible baseplate and drying.

Beneficial effects: compared with the prior art, it has excellent electrical performance when applying the adhesive composition of the Invention to the high-frequency FPC baseplate; particularly, it has low dielectric constant and low dielectric loss when the frequency is high above 1 GHZ, and has favorable bonding performance with the FPC baseplate; moreover, the adhesive composition also has favorable heat resistance. In addition, the application of the adhesive composition of the Invention in FPC baseplate has favorable colloid fluidity, dimensional stability and flexibility. The adhesive composition may undergo hardening reaction in a temperature under 180° C. When it is used as an adhesive film or a covering membrane, FPC baseplate factory can produce with the existing equipment and processing conditions. The thickness of the adhesive film or covering membrane produced with the adhesive composition can be customized as required. Normally it is 1-100 µm and 1-30 µm is preferred upon the requirement of electronic products for lightness and thinness.

BRIEF DESCRIPTION OF THE DRAWINGS

The FIGURE is an infrared spectrogram of the adhesive composition.

DETAILED DESCRIPTION OF THE PREFERRED EMBODIMENTS

The Invention will be further described in combination with the embodiments.

The details of the raw materials used in the following embodiments are:

(A) Polyimide

PIAD, solvent-soluble polyimide resin, manufactured by Arakawa Chemical.

P260, solvent-soluble polyimide resin, manufactured by UBE, Japan (B) Polyphenyl Ether PP-608, modified polyphenylene oxide resin, manufactured by Taiwan Chin Yee OPE-2ST, propenyl-modified polyphenylene oxide resin, manufactured by Mitsubishi Electrochemical (C) Epoxy Resin NC 3000H, biphenyl epoxy resin, manufactured by Nippon Kayaku Co., Ltd.

EPICLON 850S, manufactured by DIC Co., Ltd.

(D) Flexibilizer

VTBN1300X33LC, vinyl-terminated nitrile rubber, manufactured by CVC Specialty Chemicals Co., Ltd. (U.S.)

D1192ET, SBS rubber, manufactured by Kraton Performance Polymers Inc.

(E) Flame Retardant

OP935, phosphorus-based flame retardant, manufactured by Clariant, Germany Mosaflam 103, phosphorus-based flame retardant, manufactured by UFC Company (F) Inorganic Filler FB3SDC, silica micropowder, manufactured by Denka Co., Ltd.

Al(OH)3, manufactured by Showa Corporation (G) Catalyst

2E4MZ, 2-Ethyl-4-methylimidazole, manufactured by Shikoku Chemicals Corporation (H) Coupling Agent KH792, silane coupling agent, manufactured by Xuanhao Newmstar Technology The measuring methods used in the following embodiments are as follows:

Dielectric constant (Dk), dielectric loss (Df): harden the adhesive film for 2h under 175° C.; tear off the PET release membrane; cut a sample according to the testing size; measure the thickness; then the Dk and Df through the method of resonant cavity.

Peel strength: hot-press the dried adhesive film to the coarsened copper foil (at 180° C. for 2 min); hot-harden (at 175° C. for 2h); cut it into a strip of 10 mm wide and 150 mm long for tension test at 180 degree and 90 degree.

Tin furnace heat resistance: fit the copper foil to both sides of the adhesive film through hot-pressing (at 180° C. for 2 min); hot-harden (at 175° C. for 2h); cut it into a sample of 50 mm×50 mm; dip the samples into a tin furnace at 288° C. for heat resistance test and observe whether there are bubbles.

Dimensional stability: fit the copper foil to both sides of the adhesive film through hot-pressing (at 180° C. for 2 min); hot-harden (at 175° C. for 2h) and cut it into a sample of 200 mm×250 mm; Punch four holes with a diameter of 2 mm at four corners of the sample; measure the interval between the adjacent holes firstly; etch the copper foil and dry it under 80° C. for 30 min and measure the interval between the adjacent holes; determine the rate of change according to the difference of the intervals before and after etching. Then perform heat treatment under 150° C. for 30 min and measure the interval between the adjacent holes and calculate the change rate of dimension.

Embodiment 1

An adhesive composition with high frequency characteristics, wherein, the components are solvent-soluble polyimide, solvent-soluble thermosetting modified polyphenylene oxide resin, epoxy resin, flexibilizer, flame retardant, inorganic filler and catalyst; the parts by weight of the typical product are as shown in the FIGURE. Wherein, the Polyimide monomer is selected from dissoluble polyimide resin; each molecule of the polyimide resin contains at least two of fluorine functional group, aliphatic functional group and alicyclic functional group; the structure is expressed by the following formula:

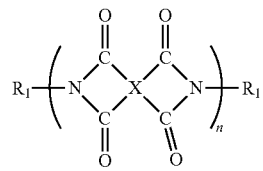

Wherein, $R_1$ separately and independently represents an organic group containing carboxyl; X separately and independently represents a quadrivalent organic group containing at least two of fluorine functional group, aliphatic functional group and alicyclic functional group; n is an integer above 0.

The end group of solvent-soluble thermosetting modified polyphenylene oxide (PPO) resin contains the organic group of hydroxyl, propenyl, vinyl, styryl or epoxy group; the average molecular weight is 1000-5000; the structure is expressed by the following formula:

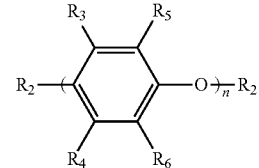

Wherein, $R_2$ represents an organic group containing hydroxyl, propenyl, vinyl, styryl or epoxy group; $R_3$ and $R_4$, identical or different, are alkyl or phenyl with a carbon number below 6; $R_5$ and $R_6$, identical or different, are alkyl or phenyl with a carbon number below 6; n is an integer larger than zero but smaller than 300.

The method for preparing the above adhesive composition includes the following steps to: dissolve the polyimide, polyphenyl ether and epoxy resin in the solvent of butanone, methylbenzene or cyclohexanone respectively; mix the rubber, filler and flame retardant; add the solvent of butanone, methylbenzene or cyclohexanone and stir it to prepare a sizing agent; mix the two mixtures and add coupling agent and accelerant; stir it at a rate of 500 rpm/min for 2h and then unload it to obtain the adhesive composition.

TABLE 1

Components of each embodiment and reference example

| | Components | Product of the embodiment | | | | | | |
|---|---|---|---|---|---|---|---|---|
| | | 1 | 2 | 3 | 4 | 25 | 6 | 7 |
| A | PIAD | 55 | — | 42 | 55 | 55 | 55 | 78 |
| | P260 | — | 55 | — | — | — | — | — |
| B | PP-608 | 25 | 25 | 30 | — | 25 | 25 | 8 |
| | OPE-2ST | — | — | — | 25 | — | — | — |
| C | NC3000H | 20 | 20 | 28 | 20 | — | 20 | 14 |
| | EPICLON 850S | — | — | — | — | 20 | — | — |
| D | VTBN1300X33LC | 15 | 15 | 15 | 15 | 15 | — | 15 |
| | D1192 ET | — | — | — | — | — | 15 | — |
| E | OP935 | 15 | — | 15 | — | 15 | 15 | 15 |
| | Mosaflam 103 | — | — | — | — | — | — | — |
| F | Al(OH)$_3$ | 10 | 10 | 10 | — | 10 | 10 | 10 |
| | FB3SDC | — | — | — | — | — | — | — |
| G | KBM603 | 0.1 | 0.1 | 0.1 | 0.1 | 0.1 | 0.1 | 0.1 |
| H | 2E4MZ | 0.2 | 0.2 | 0.2 | 0.2 | 0.2 | 0.2 | 0.2 |

TABLE 1-continued

Components of each embodiment and reference example

| | | Product of the embodiment | | | Reference product | | | |
|---|---|---|---|---|---|---|---|---|
| | Components | 8 | 9 | 10 | 1 | 2 | 3 | 4 |
| A | PIAD | 55 | 55 | 55 | 70 | 35 | 80 | 45 |
|   | P260 | — | — | — | — | — | — | — |
| B | PP-608 | 25 | 25 | 25 | 30 | 30 | 0 | 40 |
|   | OPE-2ST | — | — | — | — | — | — | — |
| C | NC3000H | 20 | 20 | 20 | — | 35 | 20 | 15 |
|   | EPICLON 850S | — | — | — | — | — | — | — |
| D | VTBN1300X33LC | 15 | 15 | 15 | 15 | 15 | 15 | 15 |
|   | D1192 ET | — | — | — | — | — | — | — |
| E | OP935 | — | 15 | — | 15 | 15 | 15 | 15 |
|   | Mosaflam 103 | 15 | — | — | — | — | — | — |
| F | Al(OH)$_3$ | 10 | — | — | 10 | 10 | 10 | 10 |
|   | FB3SDC | — | 10 | — | — | — | — | — |
| G | KBM603 | 0.1 | 0.1 | — | 0.1 | 0.1 | 0.1 | 0.1 |
| H | 2E4MZ | 0.2 | 0.2 | — | 0.2 | 0.2 | 0.2 | 0.2 |

Note:
The data in the table are in the parts by weight for the solid component.

It is shown by the data that the absorption band of the aromatic imide is mainly manifested in the asymmetrical stretching vibration peak of carbonyl on 1780 cm$^{-1}$ imide ring, stretching vibration peak of C—N on 1380 cm$^{-1}$ imide ring and bending vibration peak of carbonyl on 720 cm$^{-1}$ imide ring. As shown in the FIGURE, the infrared spectrogram (FT-IR) of the adhesive composition, it is clear that, despite of the upper limit 40% and the lower limit 80% of the proportion of polyimide, the increased absorption peaks appear around 1782-1784 cm$^{-1}$, 1380-1382 cm$^{-1}$ and 720 cm$^{-1}$, which correspond to the absorption peaks of different groups of polyimide; while on the FT-IR of the adhesive composition containing small proportion, i.e., 30% of polyimide, the peak position and strength demonstrate visible difference with the adhesive composition containing higher proportion of polyimide (40%, 80%); the former absorption peak between 1782-1784 cm$^{-1}$ has shifted to below 1780 cm$^{-1}$ (1776 cm$^{-1}$) with an average difference of 5 cm$^{-1}$; and the former absorption peak at 720 cm$^{-1}$ has shifted to above 720 cm$^{-1}$ (728 cm$^{-1}$) with an average difference of 8 cm$^{-1}$. The strength at 728 cm$^{-1}$ and 1384 cm$^{-1}$ is so weak that there is almost no absorption peak appeared. The physical property data of the products are as shown in Table 2.

TABLE 2

The physical property data of the products

| | | Peel strength of the copper foil (N/cm) | Tin furnace heat resistance (288° C./times) | Dielectric constant Dk (10 GHZ) | Loss factor Df (10 GHZ) |
|---|---|---|---|---|---|
| Products of the embodiments | 1 | 1.82 | >20 | 2.82 | 0.008 |
| | 2 | 1.8 | >20 | 2.82 | 0.008 |
| | 3 | 1.82 | >20 | 2.83 | 0.007 |
| | 4 | 1.86 | >20 | 2.82 | 0.009 |
| | 5 | 1.86 | >20 | 2.8 | 0.007 |
| | 6 | 1.72 | >20 | 2.8 | 0.007 |
| | 7 | 1.74 | >20 | 2.81 | 0.007 |
| | 8 | 1.76 | >20 | 2.83 | 0.008 |
| | 9 | 1.81 | >20 | 2.80 | 0.007 |
| | 10 | 1.84 | >20 | 2.82 | 0.007 |
| Reference products | 1 | 0.62 | 0 | 2.98 | 0.09 |
| | 2 | 0.68 | >20 | 3.26 | 0.15 |
| | 3 | 1.82 | >20 | 3.22 | 0.18 |
| | 4 | 0.82 | 0 | 2.94 | 0.09 |

Through adjustment of the proportion of each component in the formula, products 1-10 all have favorable peel strength, heat resistance, dielectric constant and loss factor at high frequency.

It is clear from reference product 1 that, when no epoxy resin is added, the crosslinking degree of colloid is decreased, the peel strength and heat resistance become poor obviously.

It is clear from reference product 2 that, when the adding proportion of polyimide is too low, the high frequency electric characteristics of the colloid is poor and the peel strength of the material is declined obviously.

It is clear from reference product 3 that, when no PPO is added, the high frequency electric characteristics of the colloid are poor.

It is clear from reference product 4 that, when the proportion of PPO is too high, the peel strength and heat resistance of the colloid is declined obviously.

Embodiment 2

An adhesive film and covering membrane is obtained by applying the adhesive composition obtained in embodiment 1 onto the primary side of the flexible substrate and drying it at 140° C. for 2 min The application of the adhesive film includes the following steps to: fit the adhesive side of the adhesive film with release membrane onto the material to be adhered; retransfer the adhesive film to the material to be adhered through a laminating machine at the temperature of 80-100° C.; peer off the release membrane and fit it to the other material to be adhered; perform hot pressing and hardening. The temperature for hot pressing is preferred to be 120-180° C. and the time 1-5 min. The temperature for hot hardening is preferred to be 160-200° C. and the time 60-150 min The application of the covering membrane includes the following steps to: fit the covering membrane to the material to be adhered for false adhesion at a temperature of 40-60° C. for the lower plate and 60-80° C. for the upper plate for 5-20 min; then perform hot pressing and hardening. The temperature for hot pressing is preferred to be 120-180° C. and the time 1-5 min. The temperature for hot hardening is preferred to be 160-200° C. and the time 60-150 min.

What is claimed is:

1. An adhesive composition with high frequency characteristics, wherein, the adhesive composition has a total weight of the following components in 100 parts by weight, consisting of A: 30-60 parts by weight of solvent-soluble polyimide, said solvent-soluble polyimide having the structure expressed by the following formula:

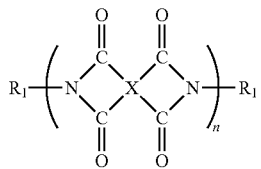

wherein, R1 represents an organic group containing carboxyl; X represents a quadrivalent organic group containing at least two of fluorine functional group, aliphatic functional group and alicyclic functional group; n is an integer above 0;

B: 5-25 parts by weight of propenyl-modified polyphenylene oxide resin, in which the end group of the propenyl-modified polyphenylene oxide resin contains propenyl organic group, wherein the average molecular weight of said propenyl-modified polyphenylene oxide resin is 1000-5000, and the structure is expressed by the following formula:

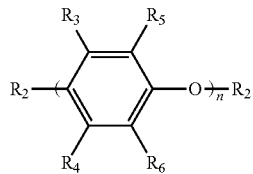

wherein, R2 is an organic group containing a propenyl group; R3, R4, R5 and R6 are all selected from alkyl or phenyl with a carbon number below 6; n is an integer not larger than 300;

C: 10-20 parts by weight of epoxy resin;
D: 10-15 parts by weight of flexibilizer;
E: 10-15 parts by weight of flame retardant;
F: 5-10 parts by weight of inorganic filler
G: greater than zero and not exceeding 1 part by weight of coupling agent; and
H: 0.2-0.5 parts by weight of catalyst.

2. The adhesive composition with high frequency characteristics of claim 1, wherein A is 30 parts, or 40 parts, or 50 parts;
B is 6 parts, or 18 parts or 22 parts;
C is 10 parts, or 14 parts, or 18 parts, or 20 parts;
D is 10 parts;
E is 11 parts;
F is 7 parts;
G is 0.1 parts; and
H is 0.2 parts.

3. The adhesive composition with high frequency characteristics of claim 1, wherein G is 0.1-0.5 parts.

* * * * *